Dec. 11, 1951 A. MONTANI 2,578,083

TIME-DIVISION MULTIPLEX SYSTEM WHEREIN THE DURATION OF EACH RECEIVED SAMPLE IS EFFECTIVELY INCREASED

Filed July 7, 1948

*INVENTOR.*
ANGELO MONTANI

BY [signature]

ATTORNEY

Patented Dec. 11, 1951

2,578,083

UNITED STATES PATENT OFFICE 2,578,083

TIME-DIVISION MULTIPLEX SYSTEM WHEREIN THE DURATION OF EACH RECEIVED SAMPLE IS EFFECTIVELY INCREASED

Angelo Montani, Woodhaven, N. Y., assignor to Automatic Electric Laboratories, Inc., Chicago, Ill., a corporation of Delaware Application July 7, 1948, Serial No. 37,371

6 Claims. (Cl. 179—15)

This invention relates in general to multiplex transmission of messages and more specifically to an improvement in the type of system where a plurality of communication channels are provided by speech sampling, sometimes called time division multiplex systems.

Systems of this type for multiplex transmission are well known in the art for instance in my own prior Patent No. 2,036,350, granted April 7, 1936, and in the patent to Wolf No. 2,265,216, granted December 9, 1941. In such systems samples or pulses of a short duration, each taken from one of a plurality of different transmitters, are sent over a common transmission medium in succession to one of a plurality of receiving stations. Each sample is directed, at the receiving station, to the proper receiver for receiving intelligence from the particular transmitter from which the sample is being taken at that instant.

At the receiving end it will be understood that each receiving station will be receiving a pulse or sample of the transmitted alternating current, corresponding to the signal, for only a certain portion of each unit of time. For the purpose of illustration let us assume that there are five transmitting and receiving stations with distributors successively connecting them up in pairs to a common transmission medium. Then each receiving station will receive a speech sample lasting one fifth of the time during which samples are being transmitted from all five transmitting stations.

It is the object of this invention therefore to provide means in the receiver to repeat the received sample of speech a number of times to fill in the time before the next speech sample is received so that an almost continuous signal is received at each station.

For the purpose of illustration I have illustrated in Fig. 1 a transmitting point A and a receiving point B illustrating the features of my invention.

Figure 1:
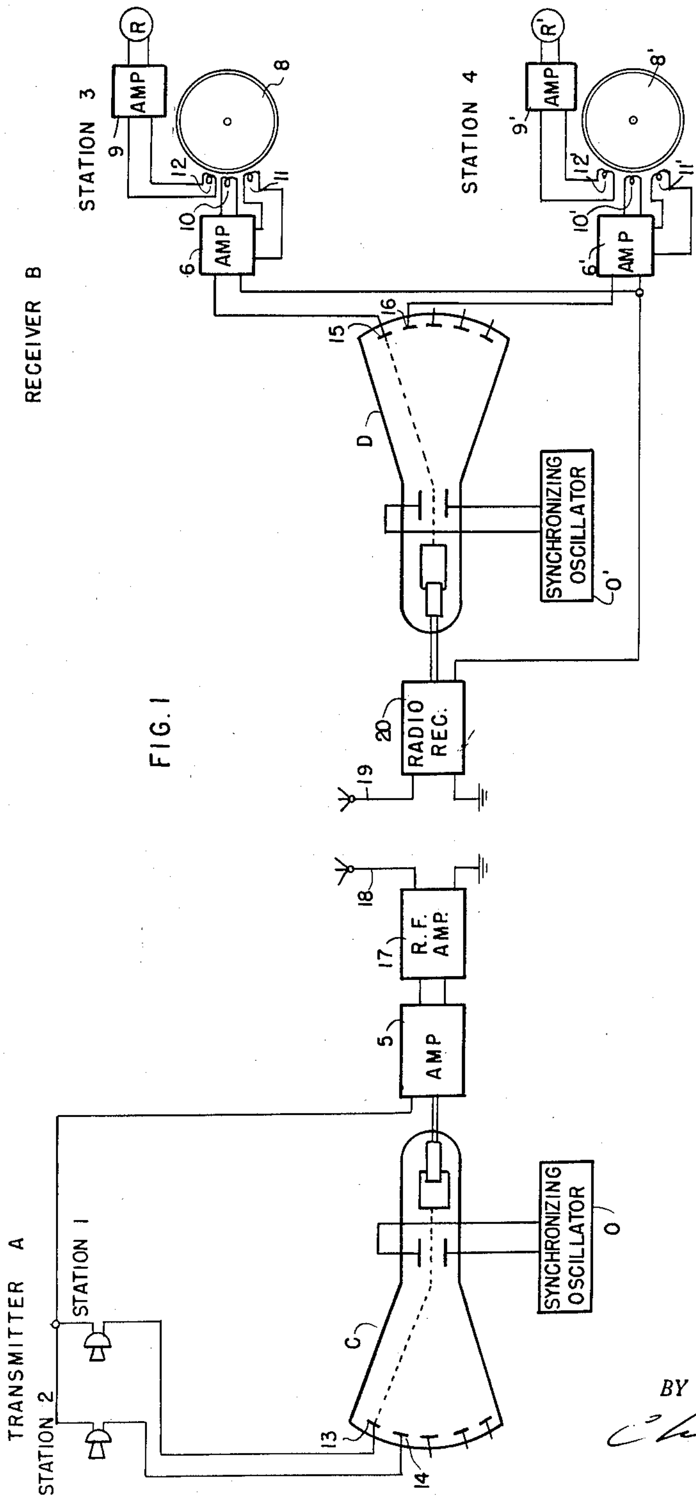

Referring to the drawing I have shown in Fig. 1 in diagrammatic form the equipment at transmitting point A and the equipment at receiving point B. For the purpose of illustration I have shown the transmitting stations 1 and 2 which are two of the five stations connected up for transmission sequentially by the cathode ray tube C which is controlled in the customary manner by an oscillator O.

At the receiver B the stations 3 and 4 are indicated as two of the five receiving stations controlled sequentially by cathode ray tube D. The tube D has its beam moved by the oscillator O′ which is synchronized in known manner with the oscillator O.

If five stations are assumed and it is further assumed that $1/200$ second is a convenient sample of the speech of each transmitting station to be transmitted, then the beam of tube C would be directed to and in contact with each of its 5 points or anodes for $1/200$ second. Thus in $1/40$ second 5 samples of speech would be transmitted one from each transmitting station. It will be understood that different times may be used if desired so that larger or shorter samples may be received and the overall time for each sweep of the tube may be varied if desired.

Each receiving station such as 13 includes an amplifier such as 6, a rotating wire or like medium 8 upon which the incoming signal sample is to be recorded, and the usual receiver R fed from amplifier 9. Associated with and fed from the amplifier 6 is a recording head 10, an erasing head 11, and a pickup 12. The wire 8 is arranged to take nearly one complete revolution during each 200th of a second so that the incoming signal sample will be recorded on practically the full length of wire 8. The erasing head 11 is arranged to be energized the instant the amplifier 6 receives a signal and to remain energized as long as a signal is being received to erase the previously recorded signal sample.

With the above general description I will now describe the operations more in detail. Assuming the beams of tubes C and D to be in the positions shown in dotted lines then sending station 1 is activated by tube C and receiving station 3 is activated by tube D. In this position operations of transmitter at sending station 1 control the amplifier 5 over the circuit including the beam of tube C and anode 13 and in turn the RF amplifier 17 to broadcast over the sending antenna 18, and to the receiving antenna 19. At the receiving station the incoming speech signal is received by radio receiver 20 and transmitted as an audio signal over the circuit to amplifier 6 including the beam of tube D and its plate 15.

In the amplifier 6 either the speech transmission is slightly delayed in known manner or at least the erasing head 11 is energized slightly in advance of the energization of recording head 10 so that a blank portion of the wire is presented to the head 10 as the wire rotates. This energization of erasing head 11 may be accomplished in a number of ways, either by control from the synchronizing oscillator, from the cathode ray tubes as they reach the different anodes, or from the amplifiers as here described. One way the erasing head 11 may be energized or rather triggered into energization utilizes a well-known automatic volume control circuit. Attention is invited to U. S. Patent 2,169,830 issued to Nelson P. Case, August 15, 1939, wherein such a typical A. V. C. circuit is disclosed. A uni-directional voltage which is proportional to the received signal is developed across resistors 60 and 61, in the cited patent, and could be applied by way of suitable filters, such as series resistor 62 and by-pass condenser 63 to the erasing head. Thus, responsive to the reception of a signal, and only when a signal is being received, a direct voltage will be developed which will be sufficient to trigger or initiate the operation of erasing head 11. The wire 8 as previously described takes nearly one complete revolution during the time interval that the beam of tube D is in contact with anode 15. The incoming signal will therefore be recorded on the wire continuously for nearly its whole length. The beams of tubes C and D are now shifted by means of the controlling oscillators O and O′ to the next anodes 14 and 16 so that the next sample transmitted will be from sending station #2 and will be received at receiving station #4.

Returning to receiving station #3 after the amplifier 6 ceases to receive a signal, the erasing head 11 is no longer energized. The pickup head 12 picks up the recorded speech an instant after it is recorded on wire 8 and transmits the signal through amplifier 9 to the receiver R. After the first rotation of wire 8 the recorded signal is again repeated by pickup 12 as many times as the wire 8 rotates before the erasing head is again energized when the next sample signal is received by amplifier 6. In the example assumed in which five sending and receiving stations are illustrated then wire 8 will be rotated approximately 5 times for each signal received once while the signal is recorded and retransmitted and four additional times while the signal is being repeated.

Figure 2:
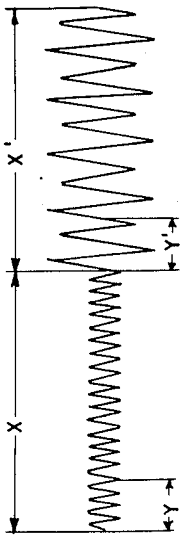
Fig. 2 is a graph showing the portion of each unit of speech transmitted and the time element involved as will be later explained.

It is known that speech is composed of a series of different frequencies each of which is continuous for a short period of time. Referring to Fig. 2 I have shown an assumed series of frequencies representing a section of frequencies which might be found in an example of speech. The section marked X is a continuing particular frequency of a syllable while the section marked Y is assumed to be that portion transmitted as a "sample." The next frequency of a syllable is indicated at X′ a sample of which such as Y′ is transmitted as a second sample.

Figure 3:
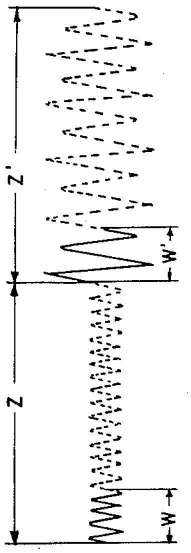
Fig. 3 is a graph showing the speech signal received by each station.

Fig. 3 represents the frequencies received at a receiving station. In this case the times Z and Z′ are the same as X and X′ Fig. 2 while the frequency indicated in full lines W and W′ indicate the sample received. The frequency indicated in dotted lines indicates the repeated signal received from the continued rotation of wire 8.

From the above it will be apparent that while each transmitting station is or may be continuously producing a series of frequencies a sample of each of say $^1/_{200}$ second is successively sent via a radio wave or the like and the samples are received successively on the receiving stations. Also while the samples from other stations are being transmitted over the common medium, the received sample is being repeated at each station to fill in the blank spaces between received samples.

While I have illustrated a particular number of stations and mentioned certain times, it will be understood that different numbers of stations may be used and samples of different length transmitted and also the distributors and the medium of transmission may be varied in accordance with known methods.

Having fully described the features of my invention what I consider to be new and novel and desire to have protected by Letters Patent will be pointed out in the appended claims.

What is claimed is:

1. In a multiplex transmission system wherein a plurality of receiving stations are sequentially connected to a plurality of transmitting stations momentarily whereby each receiving station receives only a sample of the wave form being transmitted from its associated transmitting station for a given interval, an amplifier at each receiving station, a recorder including an endless magnetic wire loop disposed to make substantially a complete pass during each time interval said receiving station is receiving a sample wave form from its associated transmitter, an erasing head and a recording head and a pick up at each station, means controlled from an amplifier in response to a received sample wave form for activating its associated erasing head and then operating its recording head to record the sample on substantially the entire length of said wire, each recording and erasing head ineffective after cessation of a received sample wave form, said pick up effective to transmit the recorded wave form to the receiving device at its associated station repeatedly after it has been recorded.

2. In a multiplex transmission system having a common transmitting medium and a plurality of transmitting and receiving stations sequentially connected to said medium with each receiver being synchronized in rapid rotation with an associated transmitter, an endless magnetic recording wire associated with each receiver, means for making substantially a complete pass of said wire during each period of time said receiver is accepting signals from its associated transmitter, a recording head disposed to magnetize said wire in accordance with signals received from said associated transmitter, a repeating head disposed to convey said signals from said recording wire to said receiver a plurality of times, and a demagnetizing head disposed to clear said recording wire before it reaches said recording head, said demagnetizing head being made operative by the inception of a signal from said transmitter and continuing operative for the duration of said signal.

3. In a receiving station, a receiving device, an endless magnetic recording means associated with said receiving device, a recording head disposed to magnetize said means, means for rapid and continuous feeding of said recording means past said recording head, means associated with said recording head for delivering an intermittent signal to said head, a repeating head disposed to convey said signals impressed upon said recording means by said recording head to said receiving device in plural repetition during intervals said recording head is not receiving signals, a demagnetizing head disposed to clear said recording means just before it reaches said recording head, and means responsive to an incoming signal for operating said demagnetizing head for the duration of said signal.

4. In a multiplex receiving system wherein a plurality of receiving stations are sequentially connected to a common transmission medium so that each station receives a momentary signal consisting of a representative alternating current wave form, an endless magnetic recording means at each station, a recording head associated with said recording means for impressing incoming signals on said recording head, means for rapidly and continuously passing said recording means past said recording head, said recording means making about a complete pass during the time a representative signal is received, a repeating head associated with said recording means disposed to convey signals impressed on said recording means to a receiver in plural repetition during intervals said recording head is not receiving signals, a demagnetizing head associated with said recording means at a point immediately before said means passes said recording head, and means for activating said demagnetizing head for the duration of an incoming signal.

5. The method of multiplex communication which comprises transmitting fragments of a plurality of disassociated signals in rapid sequence, unscrambling said signals at a plurality of receiving stations each of which is synchronized with one of said transmitted signals, magnetically recording the signals received at each receiving station, and rapidly repeating each recorded signal a plurality of times at each receiving station during each time interval between receipt of incoming signals.

6. The method of receiving multiplex communications which comprises receiving fragments of each of a plurality of communication signals in rapid cyclic sequence at each of a plurality of receiving stations, magnetically recording the signal received at each station, and rapidly repeating the recorded signal through the output of each receiving station a plurality of times during the time interval between the receipt of incoming signals.

ANGELO MONTANI.

REFERENCES CITED

The following references are of record in the file of this patent:

UNITED STATES PATENTS

| Number | Name | Date |
|---|---|---|
| 2,036,350 | Montani | Apr. 7, 1936 |
| 2,105,016 | Smith | Jan. 11, 1938 |
| 2,115,803 | Dudley | May 3, 1938 |
| 2,224,244 | Hicks | Dec. 10, 1940 |
| 2,281,405 | Barrish | Apr. 28, 1942 |
| 2,306,435 | Graham | Dec. 29, 1942 |
| 2,378,383 | Arndt | June 19, 1945 |
| 2,378,388 | Begun | June 19, 1945 |
| 2,378,389 | Begun | June 19, 1945 |
| 2,439,446 | Begun | Apr. 13, 1948 |

OTHER REFERENCES

Bell System Technical Journal, vol. 7, July 1928, pp. 535–563.